United States Patent [19]

Rostoker

[11] 3,793,058

[45] Feb. 19, 1974

[54] LIGHT-DIFFUSING CLAY COATINGS FOR LAMPS

[75] Inventor: David Rostoker, Corning, N.Y.

[73] Assignee: Corning Glass Works, Corning, N.Y.

[22] Filed: Oct. 19, 1971

[21] Appl. No.: 190,657

[52] U.S. Cl............... 117/97, 117/124 A, 117/159, 117/169 A, 313/116
[51] Int. Cl....... C03c 17/22, H01k 1/32, B44d 5/00
[58] Field of Search... 117/159, 124 A, 97, 126 GF, 117/18, 169 A; 313/116

[56] References Cited

UNITED STATES PATENTS

| | | | |
|---|---|---|---|
| 2,266,636 | 12/1941 | Hauser | 117/169 |
| 2,266,637 | 12/1941 | Hauser | 106/286 |
| 3,408,305 | 10/1968 | Torok | 242/317 |
| 3,351,409 | 11/1967 | McGuire | 117/159 |
| 1,698,845 | 12/1927 | Gustin | 313/116 |
| 2,878,136 | 3/1959 | Gustin | 117/97 |
| 3,175,117 | 3/1965 | Kardos | 117/97 |
| 2,661,438 | 12/1953 | Shand | 117/97 |

FOREIGN PATENTS OR APPLICATIONS 539,982  3/1939  Great Britain............... 117/126 GF

OTHER PUBLICATIONS

R. Grim, Clay Mineralogy, McGraw-Hill, New York, 1953, pp. 361-364 QE 471 G7.

Primary Examiner—Murray Katz
Assistant Examiner—William H. Schmidt
Attorney, Agent, or Firm—Kees Von der Sterre

[57] ABSTRACT

This invention relates to abrasion-resistant, tightly bonded, light-diffusing clay coatings particularly suited for use with incandescent lamps. The plating properties of certain low-iron smectite clays, including, for example, alkali metal and certain modified alkaline earth metal montmorillonites, render them particularly suitable for use as vehicles in glass coating systems to assure even and uniform dispersement of other light-diffusing and coloring agents. For lamp applications, the clay should have at least 25 percent of the exchange capacity thereof attributable to alkali metal ions and should contain less than about 1 percent by weight of iron.

7 Claims, No Drawings

3,793,058

LIGHT-DIFFUSING CLAY COATINGS FOR LAMPS

BACKGROUND OF THE INVENTION

At present, the most widely used method for preparing a frosted or light-diffusing bulb is by etching the inside of the bulb with hydrogen fluoride. There are several disadvantages inherent in this method. Hydrogen fluoride is a toxic, corrosive and highly dangerous chemical presenting many safety problems in its use. During the etching process, dangerous volatile fluorides are evolved, and toxic waste streams from the process must be discarded, presenting a serious pollution problem.

In the preparation of light bulbs, hydrogen fluoride frosting of the glass envelope operates to diffuse and disperse the light from the filament so that a softer, more pleasant light is radiated from the bulb. Without frosting, the filament and the glare therefrom are readily apparent and give a displeasing effect. Because of the difficulties associated with handling hydrogen fluoride, methods have long been sought to provide light-diffusing qualities to light bulbs without the necessity of etching, as, for example, by coating the bulbs with a light-diffusing coating. Coating an electric lamp with a light-diffusing coating, while avoiding many of the problems associated with fluoride etching, involves numerous difficulties. Thus, the coatings must be able to withstand handling and ordinary exposure to dirt, moisture, and abrasion. Further, in the case of interior coatings, reaction with the filament at use temperatures must be avoided; any interaction or coating instability would adversely affect the useable life of the lamp.

Many techniques have been utilized for the application of coatings to the interior of bulb surfaces, but most are of limited commercial applicability. For example, soluble, inorganic, nonvolatile materials such as soluble metallic silicates have been used as binders for nonvolatile aggregates and applied in a liquid suspension to the bulb by spraying. Similar systems incorporating a binder which decomposes on heating have been applied to interior bulb surfaces and fired to form a coating.

The use of soluble silicate systems, however, has also been found to involve numerous disadvantages. Thus, the alkali metal silicates are quite hydrophilic in the crystalline state and readily absorb water and other impurities from the atmosphere. Current commercial practice requires that large inventories of coated but unsealed bulb envelopes be kept on hand to meet customer orders, but the hydrophilic properties of the silicates dictate that light bulbs coated with these materials be assembled within a short time after the coating has been deposited, in order to avoid undesirable contamination by absorption. This problem can be alleviated by firing treatments at temperatures sufficiently high to transform soluble silicates to an amorphous form, but the temperatures required normally exceed the softening temperature of currently available bulb glasses, and might cause deformation of the bulb. In addition, their high soda content tends to reduce the impact strength of the envelope.

SUMMARY OF THE INVENTION

I have now discovered that certain smectite clays are excellent vehicles for the purpose of providing light-diffusing coatings on glass. In particular, I have found that certain montmorillonite clays, which are representative of the dioctahedral smectites, can be suitably employed in glass coating systems to yield tightly bonded, abrasion-resistant coatings which, after suitable firing, do not readily absorb moisture from the atmosphere during storage, provided the alkali metal content and purity of the clay are sufficiently high. When employed in aqueous coating systems, these clays are readily dispersed into stable suspensions which may be simply applied to form smooth, uniform coatings on glass. The final coatings may consist of the clay alone, or may include light-diffusing agents such as silica, titania, wollastonite, or the like, and/or coloring agents of numerous types. The clay acts as an excellent vehicle for the dispersion and bonding of most inorganic light-diffusing and/or coloring constitutents.

The light-diffusing coatings of the present invention may be simply applied by preparing an aqueous slurry consisting essentially of the clay vehicle and water, and, optionally, light-diffusing and/or coloring agents; applying the suspension to the glass to form a uniform coating thereon; drying the coating to remove the water of suspension and, thus, to immobilize the coating on the glass, and finally, firing the dried coating to remove the structural water from the clay. The final coating thus consists of a dewatered or calcined clay film bonded to the glass and containing the various light-diffusing and coloring agents added to the aqueous slurry. The plating and adhesive qualities of the clay vehicle insure that a very uniform, highly stable and adherent coating will be formed.

DESCRIPTION OF THE PREFERRED EMBODIMENTS

The most important constituent of the coating composition of the present invention is the clay vehicle. Since these clay-based coatings are primarily intended for use on the interior surfaces of incandescent lamp bulbs, they must be uniformly white, inert with respect to the lamp filament during the operation of the bulb, have a good appearance when unlighted, and bond tightly enough to the glass to withstand normal handling, shipping, and processing procedures, while not deleteriously affecting the strength of the bulb. Because the clay vehicle is the principal constituent of the coatings of the invention, it must demonstrate properties completely consistent with the above requirements. I have now discovered that certain montmorillonite clays are effective as vehicles in coating systems of the kind described, and, if properly selected, will provide the basis for light-diffusing coatings meeting all of the requirements for use in incandescent lamps.

Montmorillonite is a clay mineral possessing a layered structure and strong sorptive properties. The theoretical formula is $(OH)_4Si_8Al_4O_{20} \cdot nH_2O$, with the water occupying interlayer positions in the layered structure; however, montmorillonite always differs from this theoretical formula because of substitutions within its crystal lattice, such as Fe or Mg for Al. These substitutions result in a negative charge on the layers of the montmorillonite structure, which is balanced by cations such as $Na^+$, $K^+$, $Li^+$, $NH_4^+$, and $Ca^{++}$ adsorbed in interlayer positions. These interlayer cations may, in the presence of water, be exchanged for other cations available in solution; further, the identity of the cations in these interlayer or exchange positions largely determines the properties of the clay mineral. The purified colloidal fraction of certain montmorillonites has the best potential for a light-transmissive coating because all of the crystallites are much smaller than the wavelength of light (about 0.5 microns). Other clays, such as kaolins, tend to have particles in the 2–5 microns size range.

Montmorillonite may be considered to be a member of the dioctahedral smectite clay group which also includes, for example, beidellite and nontronite. Many of these clays generally demonstrate good plating characteristics on glass and, thus, would be expected to provide uniform coatings. The saponites, or trioctahedral smectites, such as saponite, hectorite and sauconite, are capable of forming good aqueous dispersions, but do not appear to provide the plating action necessary for a uniform coating. For a further discussion of these clays and their properties, see Clay Mineralogy by R.E. Grim (2nd Ed., New York, McGraw-Hill, 1968).

Not all montmorillonite clays are suitable for use in aqueous bulb coating systems. I have discovered that, while naturally-occurring alkali-metal montomorillonites such as sodium montmorillonite will provide a uniform aqueous dispersion in the coating systems of the invention and a good plating action upon application to the glass, most naturally occurring alkaline earth montmorillonites will not. Alkaline earth montmorillonites are not normally readily dispersible in water and do not form slurries of the required stability; accordingly, they usually do not yield films of the requisite smoothness and uniformity for incandescent lamp bulbs. I have further discovered that this divergent behavior is largely attributable to the difference in exchangeable alkali metal ion content between alkali metal and alkaline earth metal clays, and that a certain minimum effective proportion of exchangeable alkali metal ions in an alkaline earth montmorillonite clay will render it suitable for use in an aqueous bulb coating system. More specifically, I have found that, if at least about 25 percent of the exchange capacity of a montmorillonite clay is attributable to the presence of alkali metal ions in the interlayer exchange positions in the clay, then that clay will demonstrate the required dispersing and film-forming properties for high-quality light-diffusing films. Thus, clays suitable for use with the present invention may be selected from the group consisting of alkali metal montmorillonites, preferably sodium montmorillonite, and alkaline earth montmorillonites, such as calcium or magnesium montmorillonite, which have at least about 25 percent of the exchange capacity thereof attributable to the presence of alkali metal ions in exchange positions.

It is also very important that clays to be used in light-diffusing coatings for lamp bulbs be as free of iron as possible. The presence of iron in the coating will impart an undesirable yellow tint to light emitted from the bulb and will also cause undesirable heating of the bulb coating during use. To be suitable for the purpose of coating lamp bulbs, therefore, I have found that the montmorillonite clay should contain less than about 1 percent of iron by weight, and, preferably, about 0.5 percent or less iron by weight. Unfortunately, most naturally occurring montmorillonites tend to have relatively high iron contents (about 3–5 percent $Fe_2O_3$ by weight), so that care must be exercised in the selection of naturally occurring clays to be certain that excessive iron is not present.

It is also preferable that the clay that is incorporated into the coating systems of the invention be a pure, fine-grained colloid, having particles of sub-micron size, which is essentially free of quartz and other granular impurities. Montmorillonite clays normally comprise the principal mineral fraction in naturally-occurring bentonites, but these bentonites also contain objectionable amounts of granular impurities such as quartz or cristobalite. These particulate impurities should be removed if a high quality, defect-free coating is desired.

Examples of suitable montmorillonite clay materials which are preferred as fulfilling all of the requirements hereinabove set forth for light-dispersing coatings include modified alkaline earth montmorillonite clays prepared as described, for example, in U.S. Pat. No. 3,408,305. As used herein, the term "modified montmorillonite" refers to montmorillonite clay which has been modified by exchanging specified ions for the naturally-occurring exchangeable ions in the clay structure, in order to purify the clay and modify its properties. The best modified montmorillonites for the purpose of the present invention are generally derived from naturally occurring, low-iron calcium bentonites by a process which comprises heating the bentonite to render it water-slakeable, agitating with water to form a slurry, shear mixing to reduce the particle size of the suspended clay, separating the sand and quartz component from the montmorillonite clay fraction, treating the clay fraction with ammonium compounds to exchange ammonium ions for the exchangeable calcium ions in the clay, and to form insoluble calcium compounds as an exchange reaction product and, finally, removing the cristobalite component and the insoluble calcium compounds from the ammonium-substituted clay by centrifuging. Optionally, the ammonium-substituted clay may be reacted with a source of alkali metal ions such as sodium or potassium carbonate to exchange the ammonium ions in the clay with alkali metal ions and, thus, to increase the alkali metal content thereof. This process is more completely described in the aforementioned patent, and reference may be made thereto for a further explanation of these matters.

The principal advantage of these modified montmorillonite clays is that they may be prepared from naturally occurring calcium bentonites of extremely low iron content, and are thus nearly iron-free. Further, they are pure colloidal materials of very fine and uniform particle size, not exceeding about 0.2 micron and averaging about 400 A. in the largest dimension, containing no quartz or cristobalite impurities. And finally, the colloidal fraction making up the modified clay material is significantly higher in exchangeable alkali than the naturally-occurring bentonite from which it is obtained.

It is apparent from the foregoing description that modified montmorillonites need not contain only alkali metal ions in exchange positions to be suitable for the purposes of the present invention. The dispersing properties of the clay, which are dependent primarily on the character of the exchangeable cations therein, will be acceptable if the modified montmorillonite has at least 25 percent, and preferably about 30 percent, of the exchange capacity thereof made up of alkali metal ions. For these clays, the exchangeable alkali metal ions are usually sodium, lithium, or potassium.

Thus, in a clay having an exchange capacity of 100 milliequivalents per hundred grams thereof, at least about 25 and preferably at least about 30 milliequivalents of that capacity should be attributable to potassium, lithium, and/or sodium ions. Usually, the alkali metal exchange capacity will not exceed about 75 percent of the total capacity of the modified clay. The remainder of exchangeable ions in the clay will normally be comprised of $Ca^{++}$, $Mg^{++}$, $H^+$, or $NH_4^+$ ions (usually $Ca^{++}$ or $Mg^{++}$), or combinations thereof. The numbers of the various exchangeable cations in the clay may be readily determined by the standard Versenate method.

While increased percentages of alkali metal exchange capacity are useful in obtaining good dispersion qualities in the clay, with clays having up to about 50 percent or more of the exchange capacity thereof attributable to alkali metal ions being useful in the manufacture of light dispersing coatings according to the invention, I have found that it may be desirable to employ clays containing lower quantities of alkali where high bulb strength is required. Thus, I have found that clays having about 25–40 percent of the exchange capacity thereof made up of alkali metal ions, with the remainder of that exchange capacity attributable to $Ca^{++}$ and $Mg^{++}$, will generaly yield bulbs of higher strength than clays containing increased quantities of alkali. The reason for this is that the alkali from the clay tends to flux the glass during the firing stage, creating surface defects which cuase weakening of the bulb envelope.

While modified alkaline earth montmorillonites are particularly preferred in providing light-diffusing clay coatings on glass according to the present invention, it will be apparent that equivalent materials, including naturally occurring alkali metal montmorillonites and other natural or artificial smectite clays having particle sizes in the submicron range may be employed, provided they are reasonably pure and low in iron, plate well on glass, and contain an effective amount of exchangeable alkali for purposes of dispersion in aqueous systems.

Clays selected as hereinbefore described are excellent film-formers and will alone be sufficient to provide coatings on glass demonstrating a useful degree of light diffusion. However, for most incandescent bulb applications, a higher degree of diffusion, such as would be sufficient to diffuse the image of the filament light source, is ordinarily required. For this purpose, I prefer to incorporate into the clay film certain light-diffusing agents, such as silica, titania, and/or woolastonite, in an amount at least sufficient to mask the bulb filament from view. If desired, equivalent light-diffusing agents such as zircon, baddeleyite, alumina, wurtzite, mullite, spodumene, and other colorless compounds or minerals having refractive indices over about 1.6 which are non-deliquescent and stable at temperatures over about 625° C. may additionally or alternatively be employed.

It may also be desirable in certain circumstances to provide a coating having both light-diffusing and coloring properties. The described montmorillonite clays are excellent vehicles for the dispersion and fixation of coloring constituents such as, for example, the transition metal coloring compounds. Thus, minor amounts of colorants such as $Cr_2O_3$, $Fe_2O_3$, $Co_3O_4$, $V_2O_5$, $MnO_2$, and the like may be incorporated into the light-diffusing coatings of the invention, if desired, to obtain a combination coloring and diffusing effect.

The application of the light-diffusing coatings of the invention to a glass article to be coated involves the broad steps of applying an aqueous coating slurry of appropriate composition to the glass article to be coated, drying to remove excess water, and firing to remove the structural water from the clay.

The coating slurry may be prepared by forming an aqueous suspension of a suitable clay in water and then adding to the suspension any desired light-diffusing or coloring agents. As much clay as possible will normally be incorporated into the suspension as will form a stable, flowable slurry; however, amounts in excess of about 5–7 percent by weight have been found to cause gelling and setting of the mixture on standing, and are preferably avoided. Smaller amounts of clay may be used, but if amounts less than about 3 percent by weight are employed, several slurry applications may be required. The suspension may be easily prepared by gradually adding powdered clay to warm water (preferably at least about 60° C.), while agitating with a high speed shear mixer, and continuing the mixing for a period of about 15–20 minutes, or until a homogeneous mixture is obtained.

Following the preparation of the clay slurry, light-diffusing agents such as silica, wollastonite, and/or titania (rutile) may be added if desired. Typical slurry additions may range from about 2–10 percent silica, 1–4 percent wollastonite, and 1/2–2 percent titania by weight, as calculated from the weight of the slurry. Preferably, fine-grained, pigment grade materials will be used. Colorants such as the transition metal oxides may also be added, the amount depending upon the amount of coloration desired. Equivalent colorants include colored glass frits and the like. The addition of light-diffusing and coloring agents should be accompanied by further agitation to insure thorough dispersion thereof.

The aqueous suspension of clay and, optionally, light-diffusing and coloring agents, may be applied to the glass to be coated by any suitable means, including dipping, spraying, brushing, or the like, I have found that even coatings may be obtained on the inside of a bulb envelope by simply pouring the suspension into the bulb, pouring out the excess, and holding the bulb on a vibrating plate for several seconds to assure uniform coverage.

Following the application of an even coating by any suitable means, I have found that quickly drying the coating to remove the water of suspension immobilizes the coating and helps to prevent the occurrence of thickness discontinuities therein. Drying for several minutes at moderately elevated temperatures (i.e., about 65° C. ) is normally sufficient for this purpose. After drying, the coating is stable and adheres well to the glass; however, it can be wiped off, as may be desirable, for example, in the seal area of an incandescent lamp envelope. It also will absorb water in a humid atmosphere, although not to the point where the coating will flake or spall from the glass.

Following drying, the coating should be fired to an elevated temperature in order to cause the clay to give up its structural water and bond to the glass surface. Structural water is primarily the water adsorbed between the layers of the clay structure. Firing is particularly important in the case of inside coatings for lamp bulbs, since it has been found that tungsten lamp filaments are sufficiently active getters to extract the structural water from the clay, resulting in the failure of the lamp after only a few hours of use. The firing temperature should thus be at least sufficient to extract the structural water from the clay, and, preferably, the highest firing temperature possible short of the softening temperature of the bulb glass. For example where the bulb glass has a softening temperature of about 696° C., it has been found that firing at 640°C. for about 4 minutes is sufficient to dewater the clay to the point where the remaining structural water is not a factor limiting the lifetime of the bulb. No sagging of the bulb glass is observed. A temperature range of about 600°-650° C. is suitable for dewatering the clay in the majority of cases. It has also been found that the firing treatment helps to bond the clay particles to themselves and to the glass, and to minimize the readsorption of water subsequent to firing. Thus, glass bulbs which have been fired may be stored for appreciable periods of time without significant increases in water content.

The light-diffusing coating applied according to the above procedure consists essentially of an at least partially fused, dewatered smectite clay film with, optionally, light-diffusing and coloring compounds contained therein. The pure clay coatings are white but very thin, not exceeding about 2 microns in thickness when deposited from a slurry containing about 5 percent by weight of clay. Such coatings appear opalescent on account of the small size of the clay particles. The coatings containing light-diffusing agents are somewhat thicker, ranging from translucent to near opaque depending upon the amount and nature of the light-diffusing agents added. These coatings are completely white in appearance, but may be colored through the addition of minor amounts of colorants. Coatings suitable for use in light bulbs consist essentially in parts by weight, of about 3-7 parts clay and, optionally, at least one light diffusing agent selected in the indicated proportion from the group consisting of silica (2-10 parts), wollastonite (1-4 parts), and titania (1/2-2 parts). They may additionally contain, as optional constituents, an effective amount of coloring agents selected from the group consisting of transition metal compounds and colored glass frits.

The invention may be further understood by reference to the following detailed examples illustrating specific embodiments thereof.

EXAMPLE I

An aqueous suspension is prepared by slowly adding 5 grams of a modified montmorillonite clay to 95 grams of warm (about 60° C.) water while agitating in a high-speed blender. The modified montmorillonite clay is commercially available as Gelwhite L from the Georgia Kaolin Company of Elizabeth, New Jersey. It is a white, purified colloidal montmorillonite having about 35 percent of the exchange capacity thereof attributable to the presence of $Na^+$ ions therein, with the remainder of the exchange capacity attributable to $Ca^{++}$ and $Mg^{++}$ ions. The dispersion qualities of this clay are good, and a stable, homogenous, flowable slurry is obtained after mixing for about 20 minutes.

A part of the slurry prepared as described is then poured into a transparent, incandescent lamp envelope, the interior is thoroughly coated, and the excess slurry is removed. The coated bulb is then placed in a vibrating plate for fifteen seconds to cause the coating to flow evenly over the surface of the bulb.

Immediately after an even coating of slurry is obtained, the bulb is placed in an oven operating at 65° C. for 5 minutes to dry and immobilize the clay. The bulb is then removed for inspection and an even, white coating is observed which adheres quite well to the bulb, but which can be removed by wiping.

After inspection, the bulb is placed in a lehr operating at 625° C. for a period of 4 minutes and then cooled to room temperature. This treatment is effective to fully dewater the clay to the point where any remaining structural water does not affect the life of the bulb. The fired coating is apparently tightly bonded to the glass.

Following firing, a lamp is assembled from the coated bulb envelope and placed in a test panel for examination. The unlighted lamp appears white in color, but the interior filamint and supporting structure may be observed through the clay film. The lighted lamp is white, having an appearance similar to currently available frosted lamps. The life of the lamp is equivalent to that of equivalent frosted or clear incandescent lamps.

EXAMPLE II

To an aqueous suspension prepared according to Example I above, 2 grams of micronized wollastonite (having particle sizes less than about 3 microns), is added while mixing to insure even dispersion. After a stable, homogeneous slurry is obtained, a coated bulb envelope is prepared, dried, and fired according to the procedure of Example I. An incandescent lamp is then assembled from the envelope and placed in a test panel for observation. The unlighted lamp is white, and the filament and supporting structure may not be observed through the coating. The lighted lamp is also white, having an appearance very similar to commercially available frosted lamps, and has a service lifetime at least equivalent to that of an equivalent commercial lamp.

EXAMPLE III pigment

A slurry was prepared according to Example I, except that 5 grams of a modified montmorillonite having about 75 percent of the exchange capacity thereof attributable to the presence of sodium ions therein was substituted for the modified montmorillonite of Example I. This modified montmorillonite is commercially available as Gelwhite GP from the Georgia Kaolin Company of Elizabeth, New Jersey. It is a white, purified colloidal montmorillonite having excellent dispersion qualities. A stable, flowable slurry is obtained after only a few minutes of mixing. After the clay has been thoroughly dispersed, 1 gram of pigmet grade titania (rutile) is slowly added to the slurry, and mixing is continued until a homogeneous mixture is obtained.

An incandescent bulb envelope is then coated with the above slurry, dried, and fired at 640° C. for 5 minutes, and an incandescent lamp is assembled therefrom. While the manufacture of the lamp is somewhat simplified because of the improved dispersing and coating qualities of the high-alkali modified montmorillonite, the bulb impact strengths obtained are not as high as may be obtained using the lower-alkali clays. However, the appearance and service life of the lamp are equivalent to commercially available lamps.

EXAMPLE IV

A slurry is prepared according to Example I, except that 5 grams of the colloidal fraction of a Wyoming bentonite is substituted for the modified colloidal montmorillonite. The principal clay mineral constituent of Wyoming bentonite is sodium montmorillonite. A bulb is then coated with this slurry, dried, and fired, and an incandescent lamp is assembled therefrom. The dispersing and coating qualities of the Wyoming bentonite are excellent, and a smooth and even coating is obtained on the glass envelope. However, the lighted bulb is slightly yellow due to the higher iron content of the bentonite (about 3 percent, as compared to less than about 1 percent for the modified montmorillonites of the preceding examples). Such a yellow color is not acceptable when a truly white lamp having the appearance of a commercial frosted lamp is required. In addition, the iron tends to absorb heat in the envelope which will reduce the lamp filament life.

EXAMPLE V

A slurry is prepared according to Example I, except that 5 grams of a highly purified colloidal calcium montmorillonite is substituted for the modified montmorillonite of Example I. Essentially all of the exchange capacity of this clay is attributable to the presence of calcium ions in exchange positions. The slurry thus prepared is too fluid and will not coat the glass without running; consequently, an uneven, nonuniform coating is obtained. A similar slurry is prepared, substituting a hectorite clay for the calcium montmorillonite, but again poor results are obtained. The hectorite slurry has a tendency to gel and does not plate well or adhere uniformly to the glass surface.

EXAMPLE VI

A slurry is prepared according to the procedure described in Example I, except that a modified montmorillonite as described in Example III, having about 75 percent of its exchange capacity attributable to sodium ions, is employed. About 0.68 grams of sodium carbonate is dispersed in the dry clay by ball-milling prior to the preparation of the slurry, in order to increase the alkali content of the final clay coating. This sodium carbonate addition is sufficient to raise the soda content of the clay to about 8 percent by weight, thereby raising the coefficient of thermal expansion of the fired clay coating to closely approximate the thermal expansion of the bulb glass (about $92 \times 10^{-7}$ cm./cm. °C.). In this way, thermal stresses which might cause weakening of the glass envelope are minimized. It is found, however, that bulb envelopes which are coated with this clay mixture according to the procedure of Example I are drastically weaker than the bulbs of the preceding examples. This behavior is attributed to the excessive soda content of the coating, which fluxes the glass during the firing stage, creating surface defects which cause weakening of the bulb envelope.

EXAMPLE VII

Bulbs coated and dried according to Example I are fired at a temperature of 550° C. for 4 minutes and then assembled into lamps. The lamps are then placed in a test panel and lighted, but fail in a matter of hours. This behavior is attributed to the presence of objectionable amounts of water remaining in the clay coating after firing, which accelerates the oxidation of the tungsten lamp filament.

From the foregoing description and examples, it is apparent that the clay coatings of the invention provide a practical substitute for fluoride etching in incandescent lamp manufacturing processes. Example II represents the best mode of carrying out the invention in order to achieve a lamp closely resembling currently-available frosted bulbs. However, the coating compositions of the invention are useful whereever a durable, tightly-bonded, light-diffusing coating on a glass article is required.

I claim:

1. A glass incandescent lamp envelope having on at least a portion of the interior surface thereof a tightly bonded, light-diffusing coating consisting essentially of a dewatered film of a modified alkaline earth montmorillonite clay, said clay having about 25–50 percent of the exchange capacity thereof attributable to the presence of alkali metal ions in exchange positions, and containing not more than about 0.5 percent iron by weight.

2. A glass incandescent lamp envelope according to claim 1 wherein said dewatered film additionally contains additives selected from the group consisting of inorganic light-diffusing agents and inorganic coloring agents.

3. A glass incandescent lamp envelope according to claim 2 wherein said clay is a modified calcium montmorillonite clay which has about 30–40 percent of the exchange capacity thereof attributable to the presence of alkali metal ions in exchange positions and comprises about 3–7 parts by weight of said dewatered film, and wherein said dewatered film further contains at least one inorganic light-diffusing agent selected in the indicated proportion from the group consisting of 1/2–2 parts by weight of $TiO_2$, 2–10 parts by weight of silica, and 1–4 parts by weight of wollastonite.

4. A process for applying a tightly-bonded, light-diffusing coating to at least a portion of the interior surface of a glass incandescent lamp envelope which comprises the steps of
   a. preparing a stable flowable aqueous slurry consisting essentially of water and a clay selected from the group consisting of modified alkaline earth montmorillonites containing not more than about 0.5 percent iron by weight and having about 25–50 percent of the exchange capacity thereof attributable to the presence of alkali metal ions in exchange positions;
   b. applying the slurry to the interior surface of a glass incandescent lamp envelope to form a coating thereon;
   c. drying the coating to remove adsorbed water; and
   d. heating the coating to a temperature in the range of about 600°–650° C. for a time at least sufficient to cause the clay to release its structural water and bond to the surface of the glass article.

5. A process according to claim 4 wherein the slurry additionally contains additives selected from the group consisting of inorganic light-diffusing agents and inorganic coloring agents.

6. A process according to claim 4 wherein the slurry additionally contains at least one inorganic light-diffusing agent selected from the group consisting of silica, titania, and wollastonite.

7. A process according to claim 6 wherein said clay is a modified calcium montmorillonite clay wherein said clay comprises up to about 7 percent by weight of the slurry, and wherein the inorganic light-diffusing agent is selected, in the indicated proportion by weight of the slurry, from the group consisting of 1/2–2 percent titania, 2–10 percent silica, and 1–4 percent wollastonite.

* * * * *